United States Patent [19]

Piber et al.

[11] 4,241,297

[45] Dec. 23, 1980

[54] DOUBLE-POLE TRIGGER SPEED CONTROL SWITCH

[75] Inventors: Earl T. Piber, Oconomowoc; Robert Pearson, Milwaukee, both of Wis.

[73] Assignee: Eaton Corporation, Cleveland, Ohio

[21] Appl. No.: 962,201

[22] Filed: Nov. 20, 1978

[51] Int. Cl.[3] .......................... H02P 5/16; H02P 7/28

[52] U.S. Cl. .................................... 318/17; 200/157; 310/50; 318/345 D; 318/345 H

[58] Field of Search .......... 318/345 H, 345 D, 345 G, 318/17; 310/50; 200/157, 6 BB, 6 C, 153 LA, 153 J

[56] References Cited

U.S. PATENT DOCUMENTS

| | | | |
|---|---|---|---|
| 3,439,248 | 4/1969 | Winchester et al. | 310/50 |
| 3,648,142 | 3/1972 | Corey et al. | 310/50 |
| 3,721,879 | 3/1973 | Corey et al. | 310/50 |
| 4,100,383 | 7/1978 | Piber | 200/157 |

*Primary Examiner*—David Smith, Jr.

*Attorney, Agent, or Firm*—Hugh R. Rather; William A. Autio

[57] ABSTRACT

A trigger speed control switch for use on portable tools having double-pole contacts with wiping action, larger contact opening gaps, screw-clamp terminals for connection of the power line conductors, a printed circuit board for mounting the speed control circuit, an adjustable trigger lock mechanism with detenting to hold it in adjusted position, and terminals for connecting a load device such as a motor as well as an external filter capacitor. A small version having all of these features is small enough for direct substitution for an on-off trigger switch as well as for universal portable tool application. A larger version having all of these features is adapted for substitution for present wired-components types of trigger speea control switches. In either case, modification of a given tool is not required to receive the double-pole trigger speed control switch.

12 Claims, 17 Drawing Figures

Fig. 12
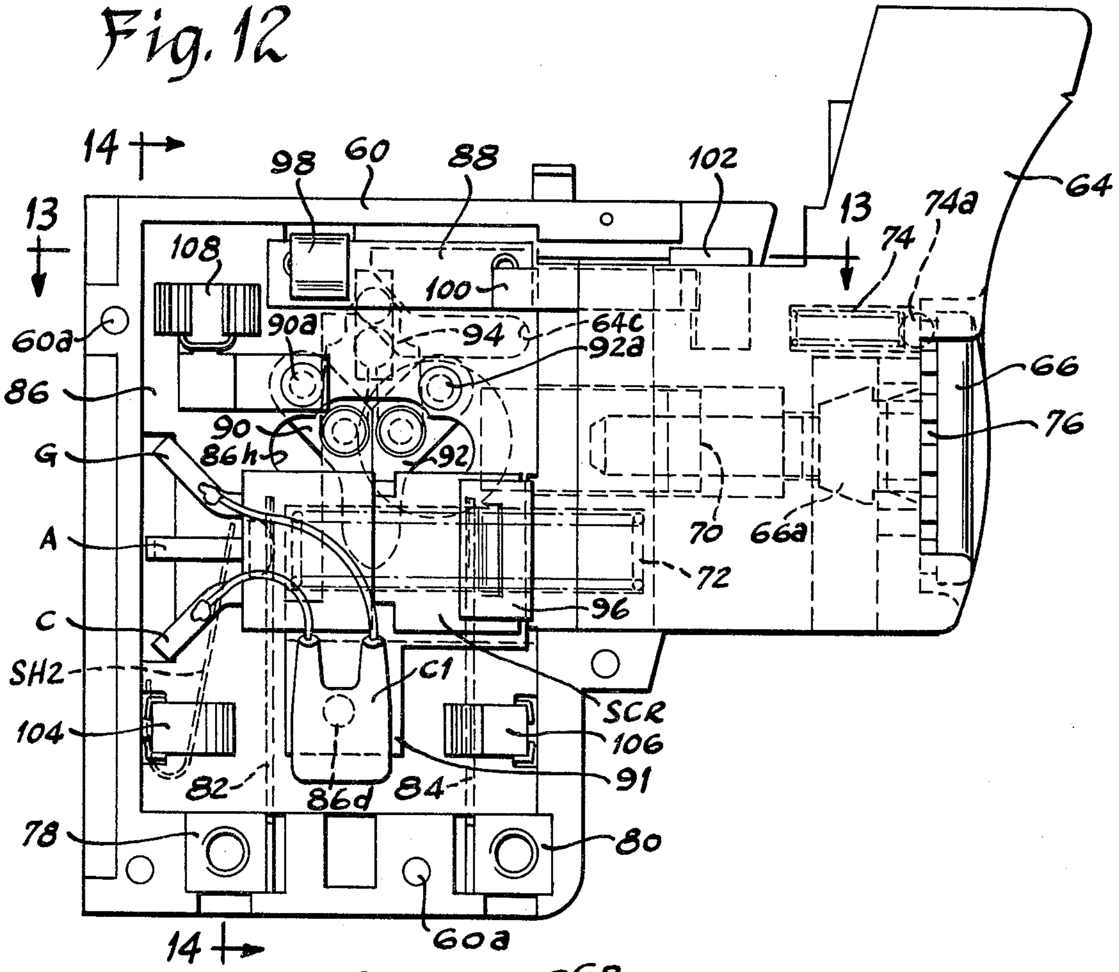
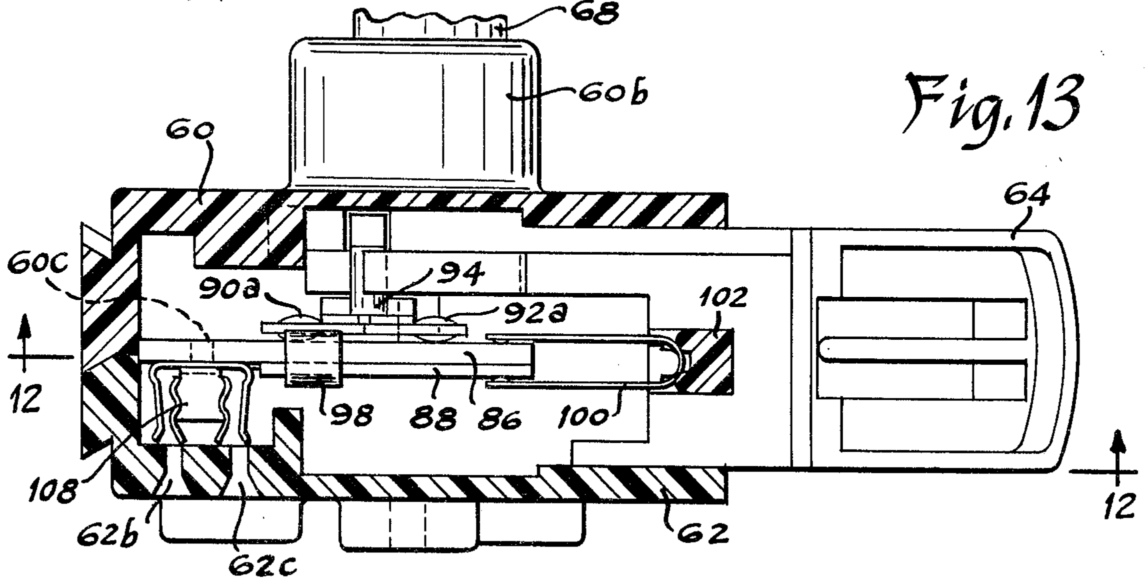
Fig. 13

DOUBLE-POLE TRIGGER SPEED CONTROL SWITCH

BACKGROUND OF THE INVENTION

Double-pole trigger speed control switches have been known heretofore. For example, H. W. Brown U.S. Pat. No. 3,775,576, dated Nov. 27, 1973, discloses a butt-contact speed control trigger switch of the double-pole contact type. In this patent, the double-pole contacts are of the type having butt-contact bridging contact members that connect power at the start of the trigger stroke and at the end of the trigger stroke one of them shunts the speed control circuit for maximum speed operation, and the line and load terminals are of the press-in lead type. It has also been known to use printed circuit boards in trigger speed control switches. However, such prior trigger speed control switches have not included all of the features that have been found desirable therein along with simplicity of structure and assembly without enlarging the external dimensions of the housing and rendering the mechanism extremely complex as well as difficult to manufacture and assemble. While such prior devices have been useful for their intended purposes, this invention relates to improvements thereover.

SUMMARY OF THE INVENTION

An object of the invention is to provide an improved speed control switch.

A more specific object of the invention is to provide an improved double-pole speed control switch.

Another specific object of the invention is to provide an improved double-pole speed control switch having larger minimum contacts opening gaps.

Another specific object of the invention is to provide a double-pole speed control switch having small external dimensions.

Another specific object of the invention is to provide an improved double-pole speed control switch having screw-clamp line terminals and larger minimum contacts opening gaps but being capable of being enclosed in a housing of small external dimensions for direct substitution for a portable tool on-off switch.

Another specific object of the invention is to provide a double-pole switch having improved contacts actuating means.

Another specific object of the invention is to provide an improved speed control switch having double-pole contacts with wiping action.

Another specific object of the invention is to provide an improved double-pole trigger speed control switch that includes, in addition to line terminals and load terminals, terminals for connecting an external filter capacitor within a housing having small external dimensions adapting it for use in a conventional portable tool handle.

Another specific object of the invention is to provide a trigger switch of conventional size with a plurality of features including double-pole contacts with wiping action and larger contact opening gaps, screw-clamp line terminals, a printed circuit board speed control circuit subassembly, an adjustable trigger lock mechanism with tactile detenting, load terminals and terminals for connecting an external filter capacitor thereto.

Another specific object of the invention is to provide a double-pole speed control switch of the aforementioned type that is simple in construction and economical to manufacture and assemble.

Other objects and advantages of the invention will hereinafter appear.

BRIEF DESCRIPTION OF THE DRAWINGS

FIG. 12 is an enlarged elevational view of the right side with the cover removed of a larger version of a double-pole trigger speed control switch to show the internal parts substantially along line 12—12 of FIG. 13;

FIG. 13 is a horizontal cross-sectional view taken substantially along line 13—13 of the switch of FIG. 12 to show the variable resistor and contacts actuating mechanism;

DESCRIPTION OF THE PREFERRED EMBODIMENT

Figure 1:
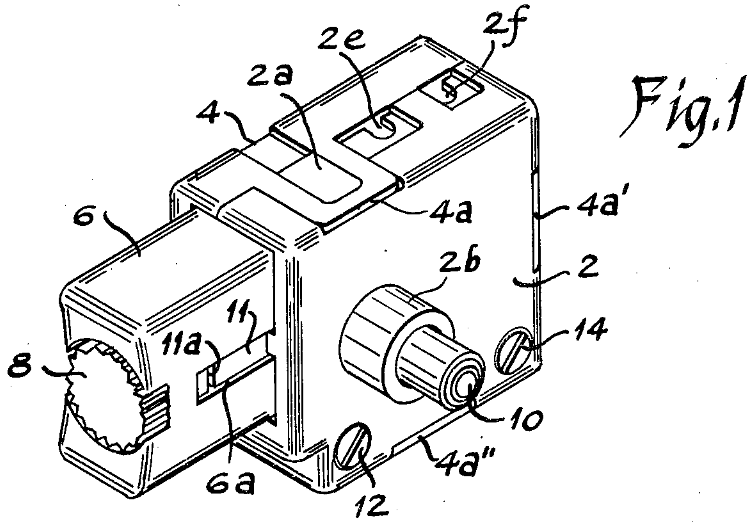
FIG. 1 is an enlarged isometric view of a double-pole trigger speed control switch constructed in accordance with the invention.

Referring to FIG. 1, there is shown a double-pole trigger speed control switch constructed in accordance with the invention. This is the small version of trigger speed control switch whereas a larger version of such speed control switch is shown in FIGS. 12–17. This small version is shown enlarged in FIG. 1 to about one and one-half times its normal size so that it actually is only two-thirds as large as shown in FIG. 1. That is an extremely small package for a switch having double-pole contacts with wider contacts opening gaps, screw-clamp terminals, electronic speed control, and the other improved hereinafter described.

As shown in FIG. 1, this switch is enclosed in an insulating housing comprising a base 2 and a cover 4 secured together by a plurality of snap-in means *2a*, *4a*; *2a'*; and *2a''*, *4a''* located at several sides of the housing. A spring-biased actuator in the form of a trigger 6 projects from the forward end of the housing. An adjustable on-lock mechanism comprising a rotary knob 8 recessed in the forward face of the trigger and a spring-biased lock pin 10 projecting from an integral bushing *2b* on the left wall of the base provide for releasably latching the trigger at any desired speed point. For this purpose, the trigger is provided with an elongated slot *6a* in the left side thereof as shown in FIG. 1. This slot provides access to an adjustable stop nut or stop block 11, when the trigger is depressed, by a catch that is actuated by stop button 10 as hereinafter described in connection with FIG. 7. As shown in FIG. 1, stop block 11 has a notch *11a* therein into which such catch enters to latch the trigger in its depressed position.

Figure 2:
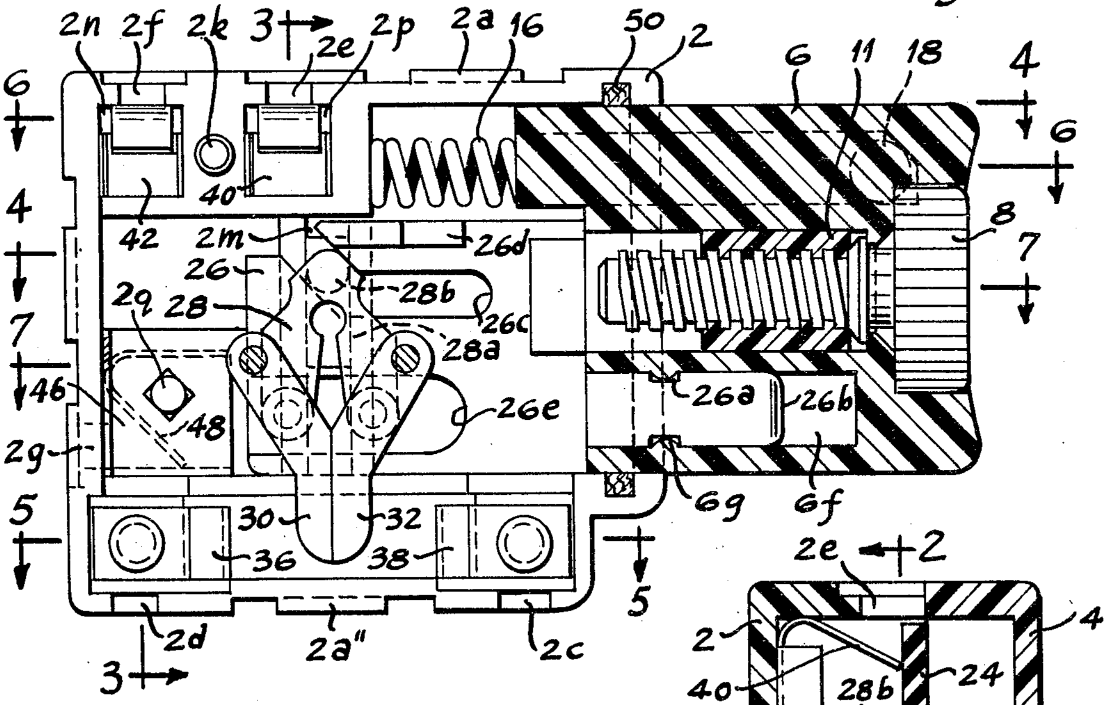
FIG. 2 is a further enlarged vertical, longitudinal cross-sectional view of the switch of FIG. 1 taken substantially along line 2—2 of FIG. 3 and showing some of the internal parts thereof.
Figure 3:
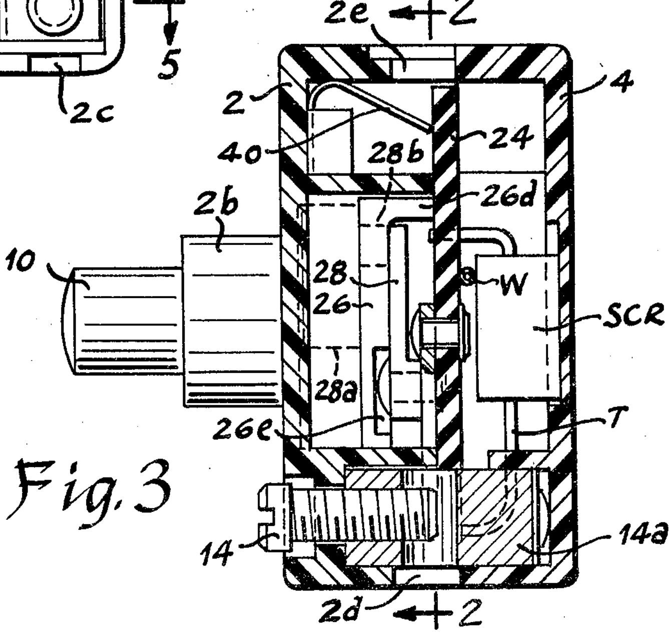
FIG. 3 is a vertical lateral cross-sectional view taken substantially along line 3—3 of FIG. 2 to show the compartments within the housing divided by the printed circuit (PC) board.

A pair of screws 12 and 14 provide for connection of a pair of power line conductors that are inserted up through terminal holes *2c* and *2d*, FIGS. 2 and 3, in the bottom of the base, these screws extending in at the lower forward and rear corners of the left wall of the base. A pair of terminal holes *2e* and *2f* at the top of the base provide access to press-in lead connectors to allow connection of a load such as a motor to this switch. Two more terminal holes *2g* and *4b* on the rear wall of the base and cover, respectively, shown in FIG. 11, provide access to press-in lead connectors to allow connection of an external filter capacitor C2, shown in FIG. 9 and 10, as hereinafter described. FIG. 11 also shows another one of the three snap-in means including lug *2a'* and loop *4a'* that secure the cover to the base, there being a third such snap-in means including a loop *4a''* and a lug *2a''* on the bottom of the housing as shown in FIGS. 1 and 2.

The internal parts of the switch of FIG. 1 are shown in further enlarged views in FIGS. 2–10.

Figure 6:
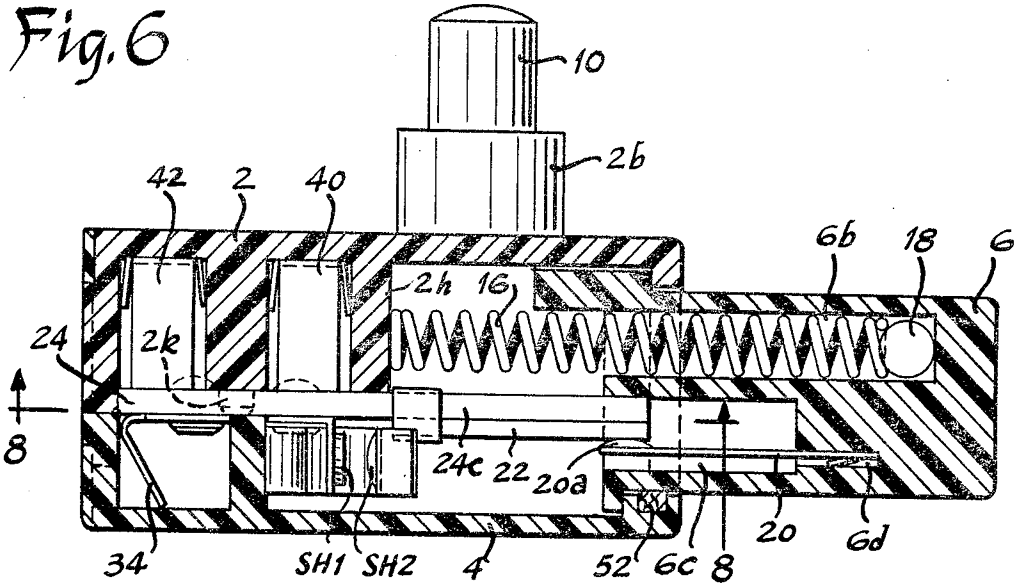
FIG. 6 is a horizontal cross-sectional view taken substantially along line 6—6 of FIG. 2 to show the load terminals and variable resistor of the switch.

The trigger is provided at its upper left-hand portion with a forwardly-extending blind hole *6b* as shown in FIG. 6 for retaining a trigger return spring such as helical compression spring 16. A sphere such as ball bearing 18 is placed in this blind hole as an abutment for the forward end of this return spring while the rear end of this spring abuts a wall *2h* within the base. This ball bearing is cammed down by the angular wall at the end of the blind hole against the corner of grooved knob 8 to provide a detent for the knob as shown in FIG. 2.

Alongside of this trigger return spring 16, the trigger is provided with means for mounting a resistor contact brush 20. This means comprises another, shorter blind hole *6c* having a deeper, narrow slot *6d* at its end for retaining resistor contact brush 20 as shown in FIG. 6. This contact brush 20 has an angular serration sheared and formed near its mounting end so that when it is pressed into slot *6d*, this serration will bite into the walls of the slot to securely mount it therein. This contact brush is bifurcated along its rear unmounted portion and the rear ends of such bifurcations are provided with contact elements *20a* for slidingly contacting and bridging a pair of resistor strips R on an insulating support 22 mounted to the rear edge of PC (printed circuit) board 24. In the free state of the contact brush, its bifurcated strips are bent to a small angle to the left so that when they are straightened out in assembly against the resistor strips, suitable contact pressure therebetween is provided.

Figure 7:
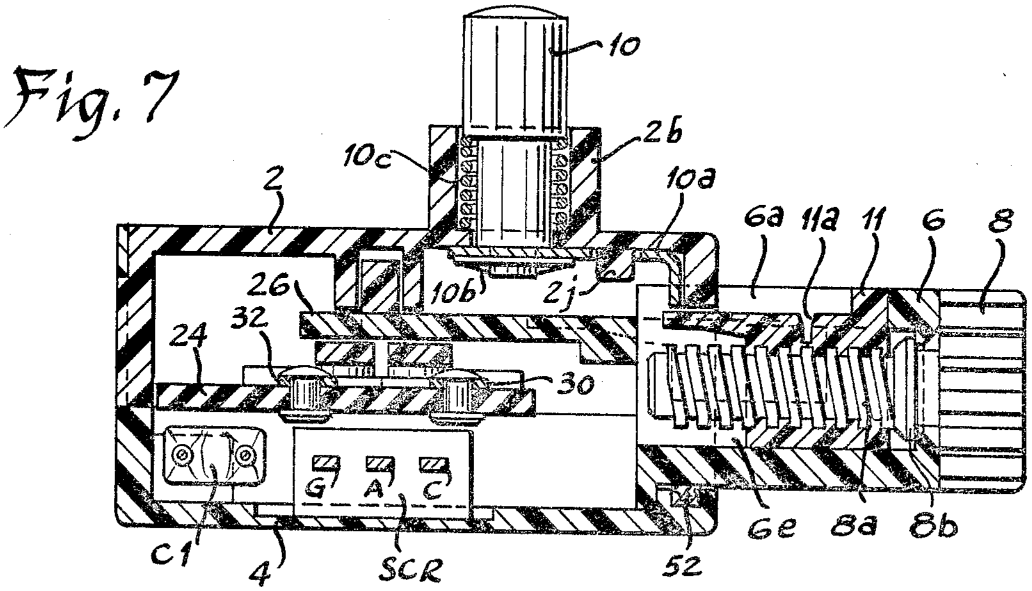
FIG. 7 is a horizontal cross-sectional view taken substantially along line 7—7 of FIG. 2 to show the contacts operating mechanism as well as the adjustable on-lock.

The trigger is also provided with means for adjusting the forward-rearward position of stop block 11 as shown in FIG. 7. This means comprises a threaded shaft *8a* integral with knob 8 that extends rearwardly into a rectangular hole *6e* in the trigger. This shaft has a beveled snap-in flange *8b* slightly spaced from the knob as shown in FIG. 7 that is forced past a beveled constriction in this hole in the trigger for snap-in assembly of the shaft so as to permit rotation thereof but prevent withdrawal thereof from the trigger. This shaft *8a* is threaded through stop block 11 so that rotation of knob 8 will slide the stop block within the trigger to adjustably position notch *11a*.

For latching the trigger, lock button 10 has a reduced diameter shank extending through bushing *2b* into the housing and a generally L-shaped catch *10a* attached to the end of this shank by a retaining ring *10b*. A helical compression spring *10c* surrounds this shank within bushing *2b* to return button 10 to its leftward extended position whenever it is released. Catch *10a* has a hole through which a locating stud *2j* in the base extends to keep this catch properly oriented with respect to the notch on the stop block. Also, the bent over tip of this catch that enters the notch in the stop block is preferably narrow whereas the remainder of the catch is wider to facilitate securing to the shank of button 10.

The trigger is also provided with means for snap-in attachment of a contacts actuator 26 thereto. This means comprises a rectangular blind hole *6f* having opposed lugs *6g* in its inside walls for snap-in cooperation with complementary notches or grooves *26a* in opposed sides of mounting shank *26b* of actuator 26 as shown in FIG. 2. The remainder of this actuator 26 is generally planar and it has an actuating cam slot *26c* shown in FIG. 2 that inclines from its upper-rear corner at a downward angle and then horizontally forward so that upon depression of the trigger, the cam follower 28 will be moved downward as hereinafter more fully described. This actuator is also provided with a ledge *26d* that guides it for movement between portions of the base and PC board 24 as shown in FIG. 3. This actuator is also provided with a groove *26e* shown in FIGS. 2 and 3 providing clearance for the heads of the rivets connecting the cam follower 28 to movable contacts 30 and 32.

Figure 4:
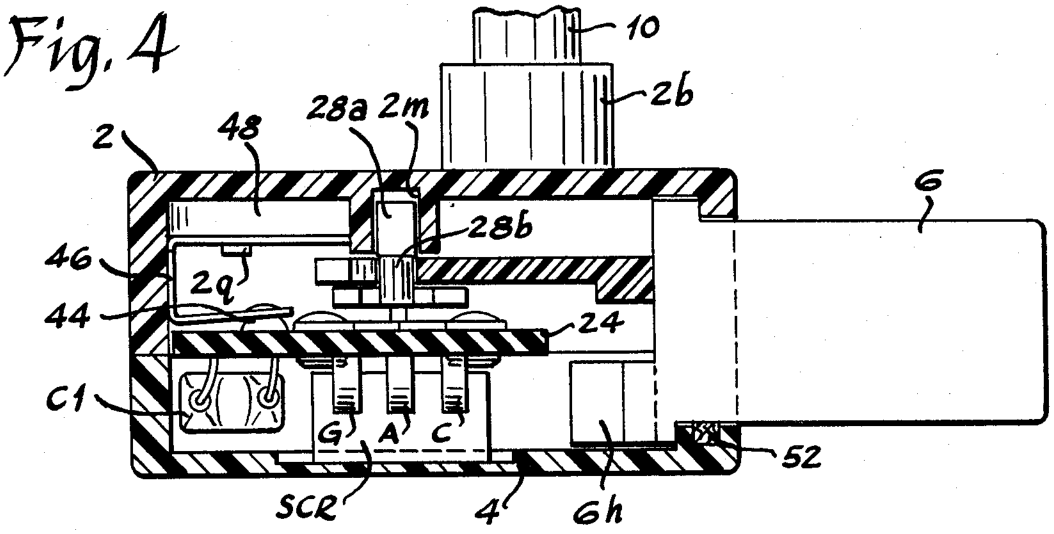
FIG. 4 is a horizontal cross-sectional view taken substantially along line 4—4 of FIG. 2 to show the contacts operating mechanism thereof.
Figure 8:
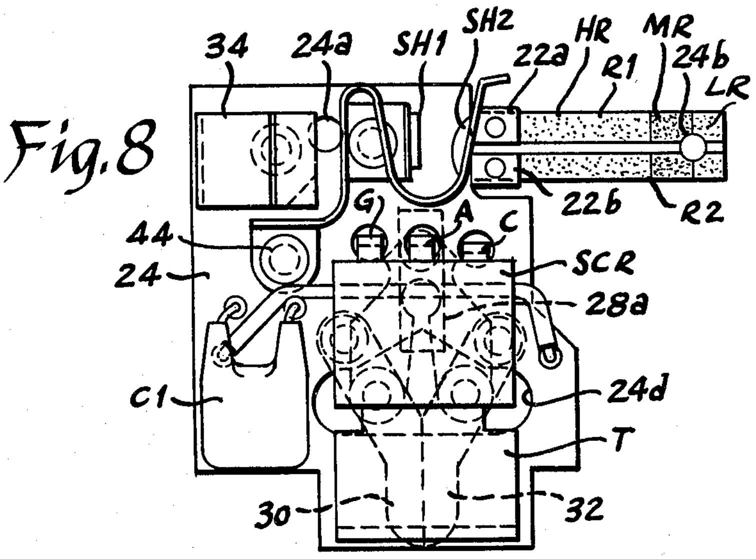
FIG. 8 is a right side elevational view of the PC board assembly of the switch taken substantially along line 8—8 of FIG. 6 to show the speed control components mounted on its front and the movable contacts in dotted lines mounted on its back.
Figure 10:
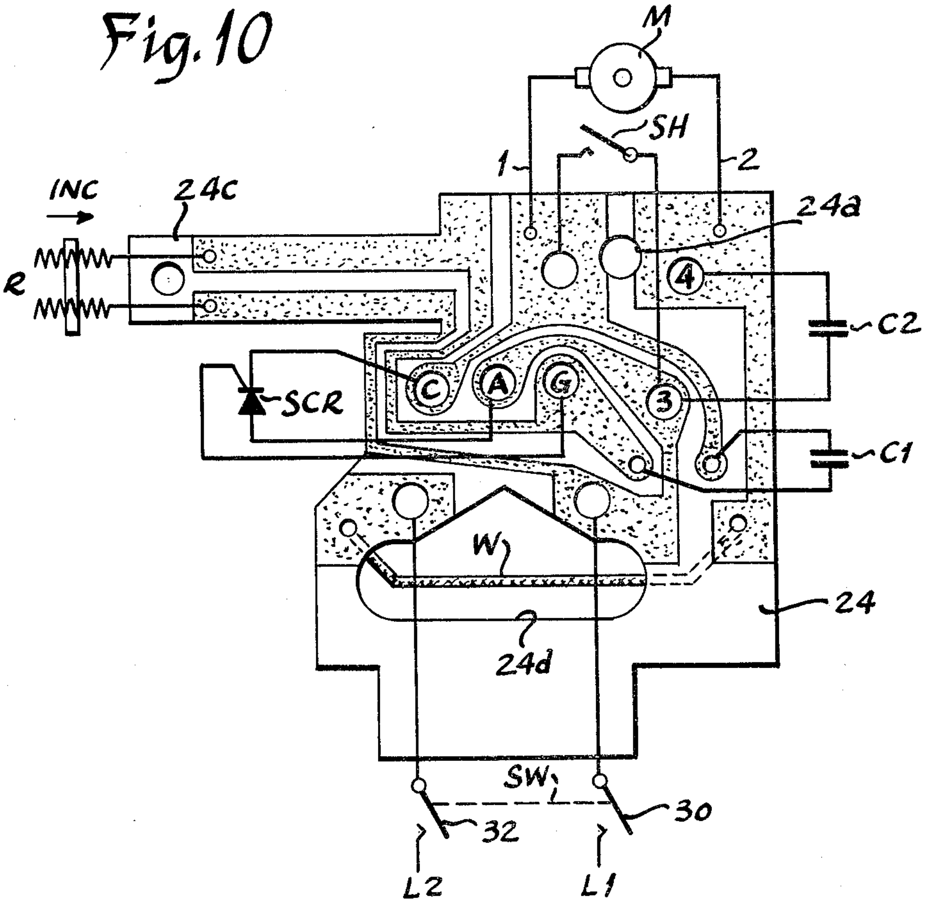
FIG. 10 is a schematic illustration of the PC board and the speed control components connected thereto.
Figure 11:
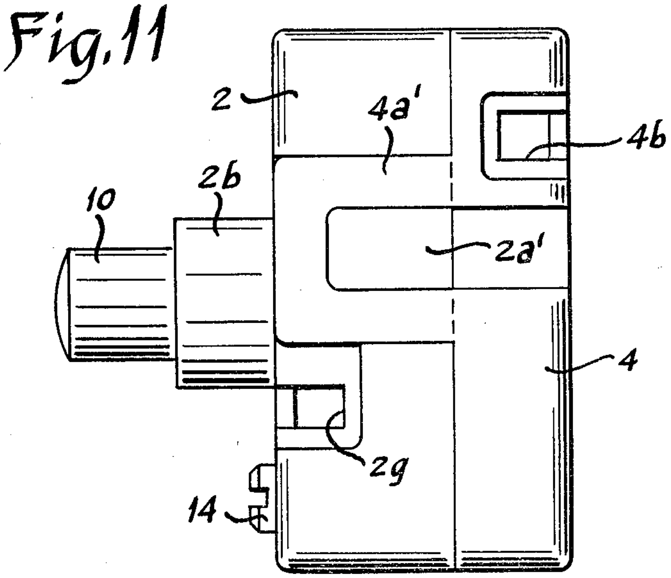
FIG. 11 is a rear elevational view of the switch of FIGS. 1–10 showing the apertures affording access to the terminals for connecting the external filter capacitor.

The speed control circuit subassembly is shown most clearly in FIGS. 4, 8 and 10. In this subassembly, PC board 24 is provided on its left surface with a printed circuit indicated by the stippled segments in FIG. 10. The circuit components such as silicon controlled rectifier SCR and capacitor C1 are mounted on the right surface of this PC board and their terminals extend through holes in the board as shown in FIG. 8 and are soldered to the printed circuit segments as schematically indicated in FIG. 10. Capacitor C1 has two terminals whereas the SCR has anode A, cathode C and gate G terminals at its upper end and a heat sink tab T extending down from its lower end and curved to abut the PC board as shown in FIG. 3, this tab being internally connected to anode A for heat dissipation purposes. The curved tip of tab T abutting the PC board holds the SCR spaced from board 24 as shown in FIG. 3 to provide space therebetween for wire W which connects two segments of the printed circuit as shown in FIG. 10.

Board 24 is provided with a locating hole 24*a* as shown in FIGS. 8 and 10 for receiving lug 2*k* integrally molded in the base as shown in FIG. 2, this lug being shown in dotted lines in FIG. 6, for securely retaining the PC board in the housing.

Figure 9:
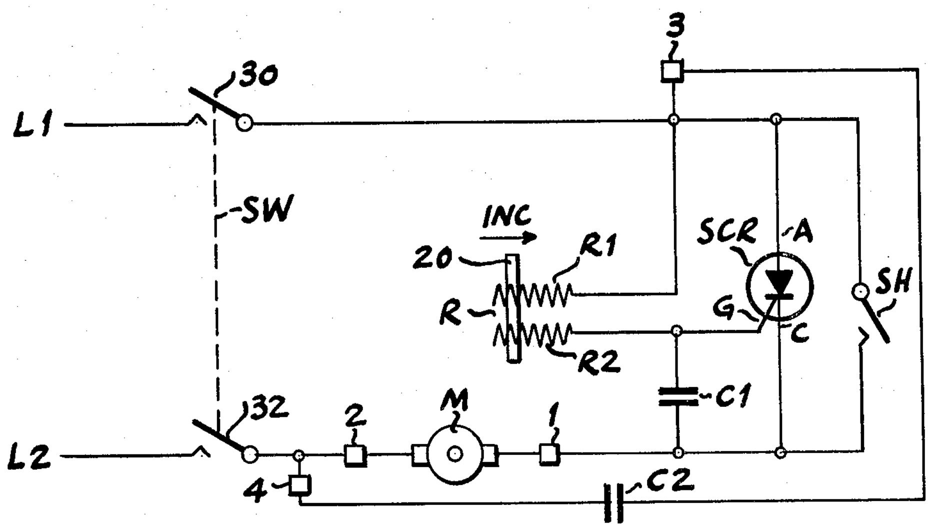
FIG. 9 is a circuit diagram of the double-pole trigger speed control switch of FIGS. 1–8.

Another circuit component mounted on the right surface of the PC board is shunting switch SH shown in FIGS. 9 and 10 and comprising a stationary contact SH1 and a movable contact SH2 shown in FIGS. 6 and 8. Stationary contact SH1 is connected by a rivet through a hole in the board to a segment of the printed circuit shown in FIG. 10. Movable contact SH2 is connected by a rivet through another hole in the board to another segment of the printed circuit shown in FIG. 10. As shown in FIG. 8, movable contact SH2 is a strip having roughly a Z-shape to provide flexibility so as to allow the free end portion thereof to be pushed into engagement with stationary contact SH1 at the end of the trigger stroke. For this purpose, trigger 6 is provided with an integral projection 6*h* shown in top view in FIG. 4. Referring to FIG. 6, it will be seen that the spring strip carrier of movable contact SH2 is directly in the path of trigger projection 6*h*, FIG. 4, for actuation by the latter.

Another circuit component mounted on the right surface of the PC board is resistor R shown in FIGS. 6 and 8 and shown schematically in FIGS. 9 and 10. This resistor R comprises two resistor strips on a phenolic sheet 22. This phenolic sheet is mounted by a lug 24*b* on the PC board extending into a hole in the resistor sheet 22 and a pair of clips 22*a* and 22*b* shown in FIG. 8 around the upper and lower edges of projection 24*c* of the PC board. As will be apparent these clips electrically connect the two resistor strips R1 and R2, FIG. 8, of resistor R to the respective printed circuit segments on the other surface of the PC board as schematically indicated in FIG. 10.

Another circuit component mounted on the right surface of the PC board is a press-in lead connector or retainer 34 shown in FIGS. 6 and 8 that is used to connect one wire of external filter capacitor C2 to a segment of the PC board as shown schematically in FIG. 10, such wire being inserted through hole 4*b*, FIG. 11, in the rear wall of cover 4. This retainer 34 is mounted by a rivet through a hole in the PC board which also electrically connects this retainer to the printed circuit segment on the other side of the PC board.

The left side, printed circuit side, of board 24 carries movable contacts 30 and 32 and cam follower 28. For this purpose, movable contacts 30 and 32 are mounted by rivets through holes in their upper ends and holes in the PC board, as shown in FIGS. 2 and 7, there being spring washers under the formed-over ends of these rivets for free rotatability of the movable contacts on the PC board. The cam follower 28 is mounted by rivets through holes in the lower ends of its legs and holes in the intermediate portions of the respective movable contacts, as shown in FIGS. 2 and 3, there being similar spring washers under the formed-over ends of these rivets for free rotatability of the movable contacts with respect to cam follower 28.

Figure 5:
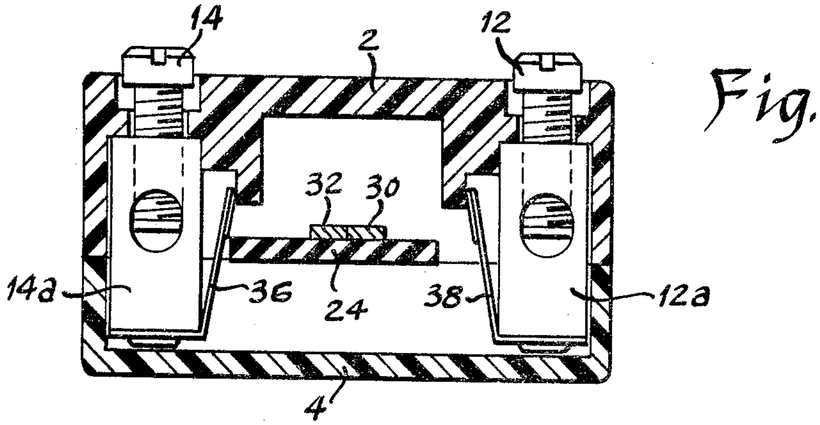
FIG. 5 is a horizontal cross-sectional view taken substantially along line 5—5 of FIG. 2 to show the line terminals and stationary contacts of the switch.

The movable contacts 30 and 32 are flat angular-shaped copper members having complementary, flat abutting edges, together assuming a Y-shaped configuration when in open position as shown in FIG. 2 for maximum opening gap with respect to stationary contacts 36 and 38 shown in FIGS. 2 and 5.

The stationary contacts are secured to screw-clamp terminal members. As shown in FIG. 5, the angularly-bent mounting end of stationary contact 36 is riveted to one end of an elongated, square-shaped block terminal member 14*a* having screw 14 threaded in its other end and a transverse hole for receiving a line conductor inserted up through hole 2*d*, FIG. 2, in the bottom of the base, the screw being then tightened to clamp the conductor to the terminal member. Stationary contact 38 is similarly attached to a like terminal member 12*a*, a line conductor inserted into the transverse hole and screw 12 then tightened. As also shown in FIG. 5, abutments are provided in the base against which the tips of the stationary contacts are biased to locate the latter precisely with respect to the movable contacts and thus to define the open contacts gaps. PC board 24 is provided with a suitable aperture 24*d* as shown in FIGS. 8 and 10 to provide clearance for the rivets that pivot the movable contacts on the legs of the cam follower and to allow swinging movement thereof when the contacts are closed.

Cam follower 28, while coupled to the movable contacts, is guided for vertical movement within the base as shown in FIGS. 2 and 4. For this purpose, the base is provided with a pair of spaced lateral walls defining a vertical slot 2*m* forming a race for the rectangular shuttle portion 28*a* of the cam follower as shown in FIG. 4. The follower portion 28*b* is cylindrical as shown in dotted lines in FIG. 2 so that it can be actuated by the edges of angular slot 26*c* when the trigger is depressed and released. The upper portions of the two legs of this cam follower have narrow portions and this cam follower is composed of a flexible material such as nylon or the like so that the legs will readily flex outwardly to swing the movable contacts closed when the trigger is depressed.

The switch is provided with a pair of load terminals accessible through holes 2*e* and 2*f*, FIG. 1, at the top of the base for connecting it to a motor or the like as shown schematically in FIG. 10. For this purpose, the base is provided with a pair of connector cavities 2*n* and 2*p* at its upper-rear portion as shown in FIG. 2. A pair of press-in lead connectors or retainers 40 and 42 are trapped in these cavities as shown in FIG. 2 and 3. Thus, load conductors inserted through holes 2*e* and 2*f* at the top of the base will be gripped between retainers 40 and 42 and the respective PC board segments as shown schematically in FIG. 10.

The switch is also provided with a terminal 3 for connecting the lower lead of external filter capacitor C2, FIG. 10, to the printed circuit through rivet 44 (FIG. 8) of the movable shunting contact. This terminal 3 is a two-part device having a connector portion 46 and a press-in lead retainer portion 48 shown in FIGS. 2 and 4. Connector portion 46 is a generally U-shaped member in top view in FIG. 4 although its shorter right arm which is self-biased against the head of rivet 44 is offset upwardly of its left arm with no overlap therebetween.

Its left arm has a square hole which is pressed with interference around cylindrical lug 2q in the base as shown in FIGS. 2 and 4 to secure the same in the base. Also, the lower edge of its left arm is bent leftwardly to abut the interior wall of the base and to provide an electrically conducting bottom surface against which the lower tip of retainer 48 is self-biased as shown in FIG. 2. Thus, when the stripped end of the filter capacitor lead is pushed in through hole 2q, it will be gripped between retainer 48 and the aforesaid leftwardly bent lower portion of connector 46, thereby to connect capacitor C2 as shown schematically in FIG. 10.

The base and cover are provided with a groove around the trigger hole for retaining a pair of sealing gaskets 50, 52 to surround the trigger except in the area of the on-lock thereby to keep dirt from entering the switch housing.

To operate this double-pole trigger speed control switch, the trigger is depressed an intial amount to close the double-pole power line switch contacts. During this initial motion, actuator 26 forces cam follower 28 downward in FIG. 2, causing its legs to bend at the narrow sections and to spread farther apart, thereby to swing movable contacts 30 and 32 into engagement with stationary contacts 36 and 38, respectively. While they are termed stationary contacts, it will be apparent in FIG. 5 that contacts 36 and 38 have some flexibility to provide a small amount of sliding action of the movable contacts thereon to keep the contact areas clean insuring a good electrical connection.

Closing the double-pole contacts thus causes power to be applied to the motor to start it running. For this purpose, current flows in FIG. 9 from line L1 through contact 30 and variable resistor R to capacitor C1 to charge this capacitor during each positive half-cycle of the line voltage. When the voltage on this capacitor reaches the gate control value of the SCR, the SCR fires into conduction to conduct current to the motor for the remainder of such half-cycle. This causes the motor to start running at a low speed in response to the rectified partial half-cycles of current.

Also, during this initial depression of the trigger, the bifurcated tips of contact brush 20 in FIG. 6 slide along resistor strips R1 and R2 of resistor R. As shown by the vertical lines in FIG. 8, these resistor strips may have short sections of low resistance LR and medium resistance MR material at the forward ends thereof followed by long sections of high resistance material HR. As a result, there will be a gradual increase in resistance change on initial trigger depression until power is applied to the motor and then contact brush 20 will slide along high resistance sections HR to decrease the resistance uniformly. Thus, additional trigger depression after the double-pole contacts close will decrease the resistance and increase the motor speed to a predetermined value.

Near the end of the trigger depression stroke, full line voltage is applied to the motor for maximum speed. For this purpose, the rear end tip 6h, FIG. 4, of the trigger engages movable contact SH2, FIG. 8, of the shunting switch to close its contacts. Referring to FIG. 9, it will be seen that shunting switching SH shunts the speed control circuit including the SCR to connect the motor across the line for full speed operation.

Referring to FIGS. 12–17, there is shown a larger version of double-pole trigger speed control switch. While the smaller version of double-pole trigger speed control switch hereinbefore described is particularly adapted for use in portable tools in place of the presently-used small on-off switch without modification of the tool handle, this larger version is particularly adapted for use in portable tools in place of the presently-used discrete component trigger speed control switch.

Figure 14:
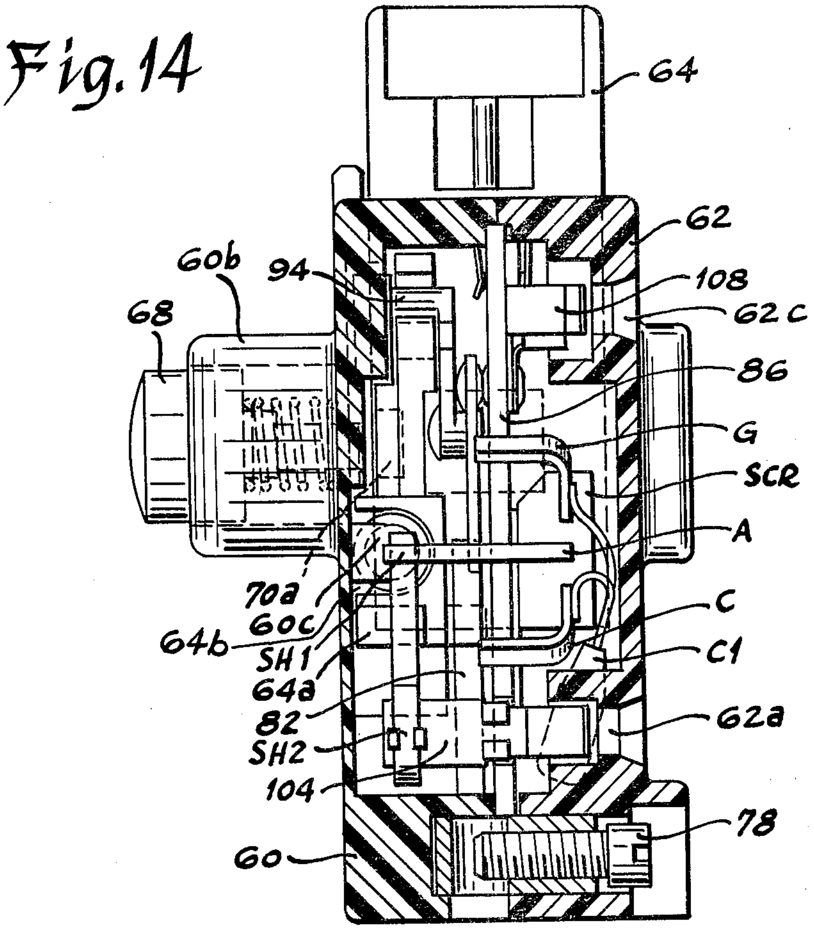
FIG. 14 is a vertical, lateral cross-sectional view taken substantially along line 14—14 of FIG. 12 to show the internal parts from a rear view.

As shown in FIGS. 12–14, this switch is enclosed in an insulating housing comprising a base 60 and a cover 62 ultrasonically welded together. For this purpose, the base may be provided with a plurality of integrally-molded cylindrical projections 60a distributed around its adjoining edge as shown in FIG. 12 that enter into corresponding slightly larger diameter but shorter blind holes in the adjoining edge of the cover for welding the two parts when they are tightly clamped together and ultrasonically vibrated.

A spring-biased actuator in the form of a trigger 64 projects from the forward end of the housing. An adjustable on-lock mechanism comprising a detented rotary knob 66 recessed in the forward face of the trigger and a spring-biased lock pin 68 projecting from an integral bushing 60b on the left wall of the base provide for releasably latching the trigger at any desired speed point as hereinafter described. For this purpose, the trigger is provided with an elongated slot in the left side thereof providing access to an adjustable stop block 70 by a catch on the inner end of stop pin integral with stop button 68. This inner end enters a notch 70a, FIGS. 14 and 15, on the stop block to latch the trigger at any speed point. The stop button may be provided with an arcuate slot for resiliency and a lug for snap-in assembly within bushing 60b. As will be apparent, stop block 70 is threaded on the shaft 66a of adjusting knob 66 so that it can be moved forwardly or rearwardly by turning this knob so as to stop the trigger at any desired depressed position and corresponding speed point. As shown in FIG. 12, the shaft of adjusting knob 66 has a collar and the trigger hole has a circular lip for snap-in assembly of the knob in the trigger generally as hereinbefore described in connection with the smaller version.

The trigger is provided at its left side with an elongated channel 64b for retaining a helical compression return spring 72 confined against the wall of the base. One end of this return spring abuts the forward end of the channel in the trigger and the other end abuts a suitable abutment 60c integrally molded in the base as shown in FIG. 4.

For detenting knob 66 in the trigger, the trigger is provided with a blind hole for retaining a small helical compression spring 74 and a ball bearing 74a as shown in FIG. 12. This ball bearing is biased against a slotted indexing plate 76 that is keyed to rotate with trigger 66.

The screw-clamp type line terminals 78 and 80 are generally similar to those in the first version as are the stationary contact strips 82 and 84 welded to the respective terminals as shown in FIG. 12.

Figure 16:
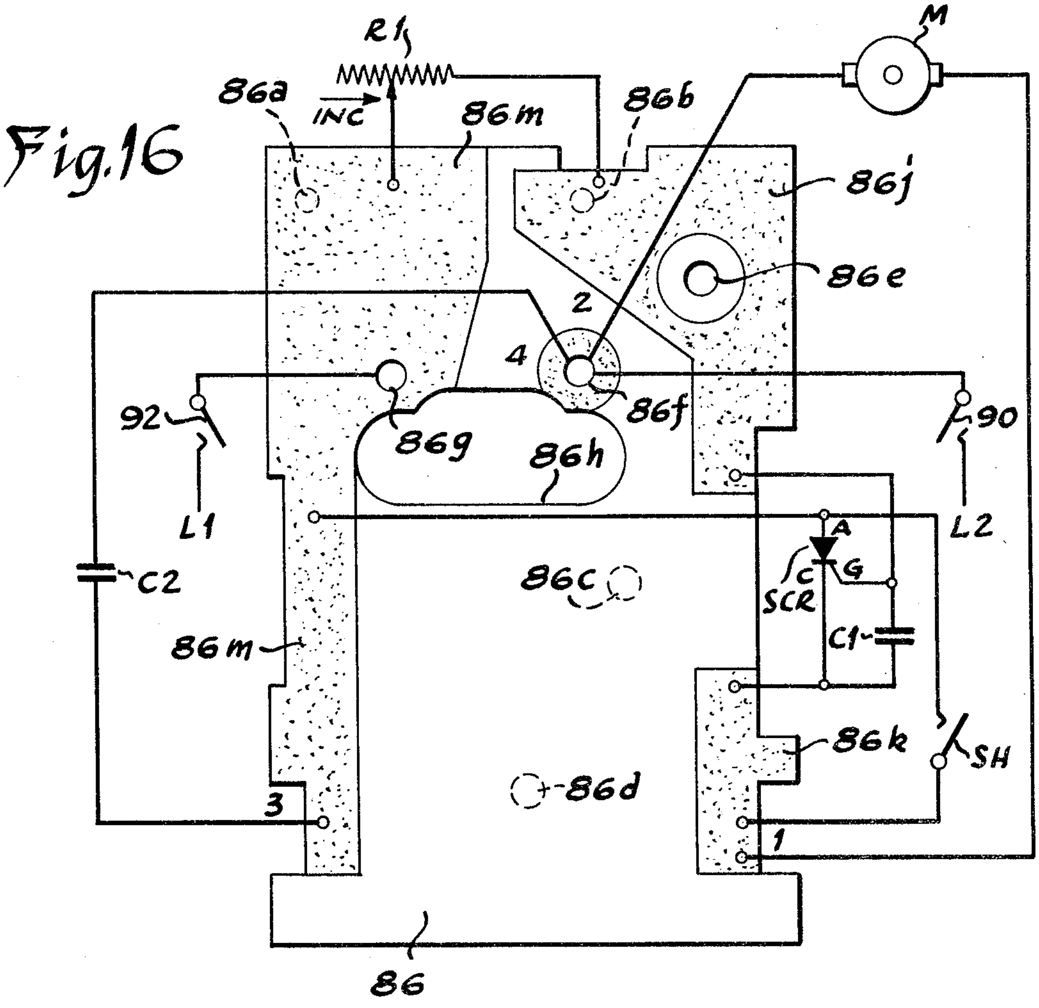
FIG. 16 is a schematic illustration of the PC board and the speed control components connected thereto.

The PC board 86 mounted in the housing is shown in FIG. 16. Its printed circuit shown in FIG. 16 is on its left surface whereas the speed control components are mounted on its right surface as shown in FIG. 12. As shown in FIG. 16, this PC board has a pair of short lugs 86a and 86b at its upper portion for mounting a resistor strip 88 as shown in FIG. 12 having resistor R1 thereon. A pair of larger lugs 86c and 86d are provided on the PC board at its mid-to-lower portion for mounting and locating a heat sink 91 shown in FIG. 12. This PC board also has a locating hole 86e at its upper portion for receiving a lug 60c molded in the base as shown in dotted lines in FIG. 13 for retaining this PC board in its place. There are also a pair of holes 86f and 86g for the mounting rivets of movable contacts 90 and 92 and an aperture 86h providing clearance for the rivets of cam follower 94. Also, there are provided three printed circuit connecting segments 86j, 86k and 86m as shown in FIG. 16. The PC segment around hole 86f is included merely to enable drilling of the hole in the correct place.

The circuit components mounted on the right surface of the PC board as shown in FIG. 12 include silicon controlled rectifier SCR having anode A, cathode C and gate G terminals, firing capacitor C1 connected across the cathode and gate terminals of the SCR, and resistor strip 88 having resistor R1 thereon. The gate and cathode terminals of the SCR are bent past the edge of the PC board and soldered to segments 86j and 86k, respectively, as schematically indicated in FIG. 16. The metal tab of the SCR that is internally connected to the anode extends forwardly as shown in FIG. 12 and is attached to the PC board by a clip 96 pressed around the edge of the board. Heat sink 91 has a hole that receives lug 86d of the PC board and is also attached to the PC board by clip 96, being beneath the SCR tab and contacting the SCR for heat dissipating purposes. Resistor strip 88 has a pair of holes for receiving lugs 86a and 86b and a clip 98 is pressed around the edge of the board to hold this resistor strip in place and to connect it to segment 86j on the other surface of the board as shown in FIGS. 12, 13 and 16. To vary this resistor, a contact brush 100 bent at its center to form two parallel arms as shown in FIG. 13 is mounted to the trigger. One arm tip of this brush contacts resistor R1 on strip 88 and the other arm tip contacts segment 86m on the other side of the PC board to connect them together as shown in FIGS. 13 and 16. Contact brush 100 is mounted to the trigger by hooking its bent-double end in a U-shaped slot and pressing a plug 102 into the slot and over the brush to hold it in place as shown in FIGS. 12 and 13.

Suitable notches are provided on the edges of the PC board to accommodate the aforementioned clips 96 and 98 as well as to provide space for the SCR terminals.

Figure 17:
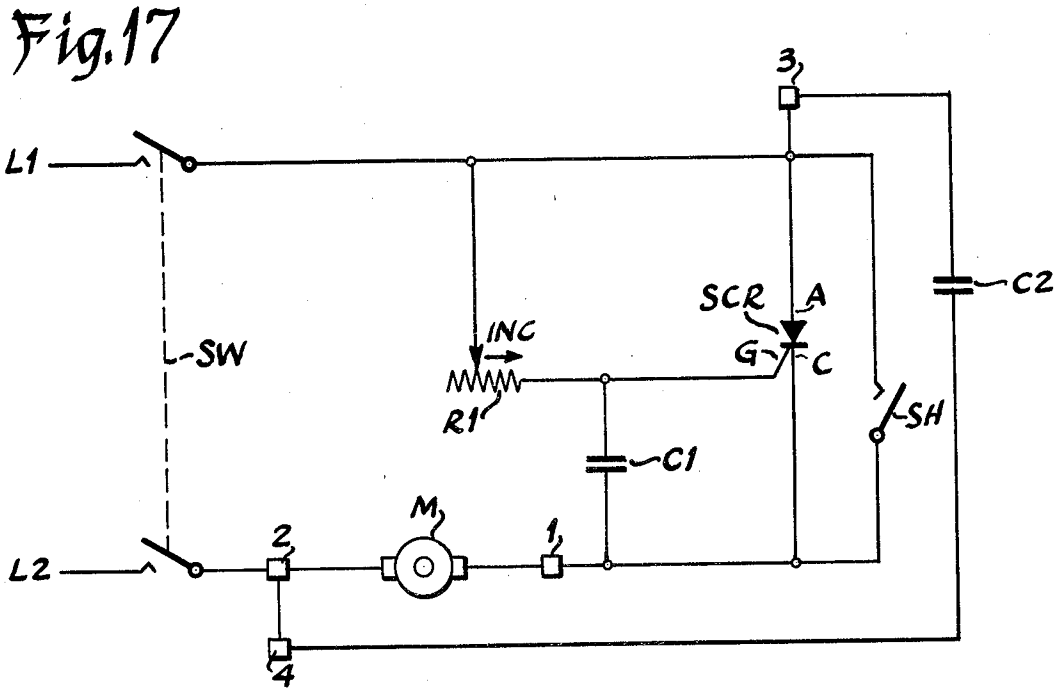
FIG. 17 is a circuit diagram of the larger version of double-pole trigger speed control switch of FIGS. 12–16.
Figure 15:
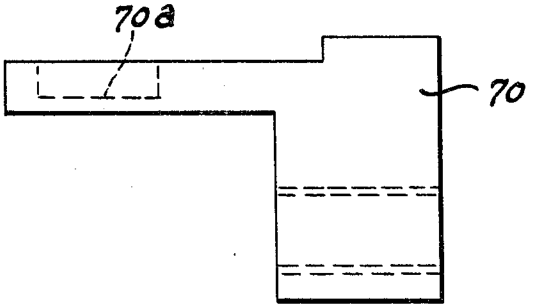
FIG. 15 is a top view of the adjustably movable stop block or stop nut that is shown in right-side elevation in broken lines in FIG. 12 and that is engaged by the stop button to hold the trigger in "on" position.

Anode terminal A of the SCR is longer than the other two and is bent leftwardly as shown in FIG. 14 to form a stationary contact SH1 for shunting switch SH shown in FIG. 17. Movable contact SH2 of the shunting switch is a leaf spring having a bent-back portion connected to terminal 104. Trigger 64 has a projection 64a at its lower-left-rear portion that actuates movable contact SH2 into engagement with stationary contact SH1 when the trigger is fully depressed for full speed operation.

This terminal 104 has a clip for attaching it around the edge of the PC board and connecting it to segment 86k, FIG. 16, a shank to which movable contact SH2 is connected as shown in FIG. 14, and a clip connector for receiving a load wire inserted through hole 62a of the cover of the housing shown in FIG. 14.

Another similar terminal 106 is clipped to the forward edge of the PC board, is connected to segment 86m by such mounting clip, and has a clip connector for receiving one wire of external capacitor C2 through a similar hole in the housing cover for making the connection shown schematically in FIG. 16.

The double-pole movable contacts are arranged and operated like those of the smaller version of switch hereinbefore described. For this purpose, movable contacts 90 and 92 are mounted by rivets 90a and 92a to holes 86f and 86g of the PC board. Rivet 92a connects contact 92 to PC board segment 86m. Rivet 90a also mounts terminal 108 and connects it to contact 90. This terminal 108 has two connector clips as shown in FIG. 13 for receiving motor M and capacitor C2 leads through a pair of holes 62b and 62c in the cover of the housing as shown schematically in FIG. 16.

Cam follower 94 is connected to the movable contacts as described in connection with the smaller version of switch in FIGS. 1–11. This cam follower is similarly guided in a vertical race in the base and is actuated by a cam slot 64c in the upper portion of the trigger. Movable contacts 90 and 92 are mounted to the PC board by rivets and have spring washers between the contacts and the board to allow freedom of pivotal movement of the contacts while maintaining an electrical connection between the parts.

When the trigger is depressed an initial amount, the double-pole contacts close to start the motor running at a slow speed. Further depression of the trigger causes brush contact 100 to decrease resistance R1 in the circuit as indicated by the arrow in FIG. 17 to increase the motor speed. At the end of the trigger stroke, shunting switch SH closes to apply full line voltage to the motor for maximum speed.

Upon release of the trigger, the shunting contact first reopens to reduce the motor speed from full speed and then the increase in resistance R1 causes SCR firing progressively later in the positive half-cycles to reduce the speed still more. Upon return of the trigger to fully extended position, the double-pole contacts reopen to disconnect the power and stop the motor.

While the apparatus hereinbefore described is effectively adapted to fulfill the objects stated, it is to be understood that the invention is not intended to be confined to the particular preferred embodiments of double-pole trigger speed control switch disclosed, inasmuch as it is susceptible of various modifications without departing from the scope of the appended claims.

We claim:

1. A double-pole variable control switch comprising:
an insulating housing;
a printed circuit board mounted in said housing;
a variable power control circuit connected to said printed circuit board;
a pair of screw-clamp power line terminals mounted in said housing and having stationary contacts connected respectively thereto;
a pair of movable contacts pivotally mounted at first portions thereof on said printed circuit board for outwardly swinging movement in opposite directions into engagement with the respective stationary contacts;
a cam follower member having a shuttle portion and a follower portion and actuator portions to which second portions of said movable contacts are pivotally connected;
a race in said housing for guiding said shuttle portion for reciprocal movement of said cam follower;
a spring-biased switch operator mounted in and extending from said housing for variable switch control movement;
said switch operator comprising a cam responsive to said control movement for acting on said follower portion to cause said shuttle portion to traverse said race and to cause said actuator portions to swing said movable contacts so that third portions of the latter engage the respective stationary contacts, and being responsive to return movement of said switch operator for reopening said movable contacts to relatively large contact gaps;

and load terminals accessible through holes in said housing for connecting a load to said variable power control circuit.

2. The double-pole variable control switch claimed in claim 1, wherein:

said movable contacts, are elongated members having said first portions at one end thereof whereby they are pivotally mounted, said second portions thereof are intermediate points pivotally connected to said actuator portions of said cam follower member, and said third portions are contacts at the other end thereof for engaging said stationary contacts;

and said cam follower member is comprised of resilient material and said actuator portions thereof comprise a pair of flexible legs to the ends of which said intermediate points of said movable contacts are pivotally connected whereby said legs bend outwardly in response to said control movement of said switch operator to swing said movable contacts closed.

3. The double-pole variable control switch claimed in claim 1, wherein:

said switch operator comprises adjustable stop means;

and said housing comprises a spring-biased lock member movable to engage said adjustable stop means in an actuated position of said switch operator.

4. The double-pole variable control switch claimed in claim 3, wherein:

said adjustable stop means comprises notches advancing to successive adjusted positions thereof;

and said spring-biased operator comprises a detent biased against said notches by the operator bias spring to provide a tactile detent for adjustment of said stop means.

5. The double-pole variable control switch claimed in claim 1, wherein:

said variable power control circuit comprises stationary and movable shunting contacts mounted on said printed circuit board;

and an extension on said switch actuator for closing said shunting contacts at highest variable control to by-pass said variable power control circuit and apply full line voltage to the load.

6. The double-pole variable control switch claimed in claim 1, wherein:

said printed circuit board comprises terminals and said housing comprises holes accessible thereto for connecting an external filter capacitor to said variable power control circuit.

7. The double-pole variable control switch claimed in claim 1, wherein said variable power control circuit comprises:

an SCR mounted on and connected to the printed circuit on said board;

and a resistor-capacitor means mounted on and connected to said printed circuit on said board for controlling variable firing of said SCR.

8. The double-pole variable control switch claimed in claim 7, wherein:

said resistor-capacitor means comprises a contact brush mounted on said switch operator for varying the value of said resistance in said variable power control circuit in response to actuation of said switch actuator thereby to control the firing angle of said SCR.

9. The double-pole variable control switch claimed in claim 1, wherein:

said stationary contacts comprise flexible contact strips connected to the respective screw-clamp power line terminals and being subject to flexing to provide a small amount of wiping action when engaged by said movable contacts.

10. A double-pole trigger speed control switch adapted for mounting in the handle of a portable electric tool comprising:

an insulating housing having a trigger opening in the forward end thereof;

a printed circuit board mounted within said housing so as to divide the space therewithin into two compartments and having its printed circuit including segments on a first side of said board;

a variable speed control circuit comprising circuit components on the other side of said board and connected to said printed circuit segments;

a pair of power line terminals mounted in said housing in relatively widely spaced apart locations and having stationary contacts secured respectively thereto;

a pair of elongated movable contacts pivotally mounted at their upper ends to said printed circuit side of said board to enable their lower ends to be spread out and swung into closed engagement with the respective stationary contacts;

a generally inverted U-shaped actuator member with one of its legs defining a shuttle portion, the other leg being bifurcated and defining hinged transversely spaced-apart actuator elements to which intermediate points of the respective movable contacts are pivotally connected, and the bight portion of said actuator member defining a cam follower;

a vertical race in said housing for guiding said shuttle portion for reciprocal movement of said actuator member;

a spring-biased trigger mounted in said housing and extending from said trigger opening for depression by the finger of the user;

said trigger comprising a cam engaging said cam follower bight portion of said contact actuator to move said contact actuator down on trigger depression and swing said lower ends of said movable closed against said stationary contacts, and being responsive to trigger return for retracting said lower ends of said movable contacts open to large gaps with respect to said stationary contacts;

and load terminals accessible for connecting the tool motor to the variable speed control circuit on said printed circuit board.

11. The double-pole trigger speed control circuit adopted for mounting in the handle of a portable electric tool claimed in claim 10, wherein:

said printed circuit board comprises a forwardly projecting strip within said housing;

said circuit components comprise a resistor mounted along said strip and connected to said printed circuit on said first side of said board;

and said trigger comprises a contact brush mounted thereon at one end and having its other end biased against said resistor to decrease the resistance in said variable speed control circuit when said trigger is depressed.

12. The double-pole trigger speed control switch adapted for mounting in the handle of a portable electric tool claimed in claim 10, wherein:

said trigger comprises an adjustable stop block moved by a rotary knob recessed in the face of the trigger;

and said housing comprises a stop button actuated catch for latching onto said stop block at a selected trigger depression.

* * * * *